UNITED STATES PATENT OFFICE.

CARLETON B. HUTCHINS, OF ANN ARBOR, MICHIGAN.

IMPROVED COMPOUND FOR COVERING ROOFS AND OTHER STRUCTURES.

Specification forming part of Letters Patent No. 79,472, dated June 30, 1868.

*To all whom it may concern:*

Be it known that I, CARLETON B. HUTCHINS, of Ann Arbor, in the county of Washtenaw, in the State of Michigan, have invented a new and Improved Composition for Covering Roofs, and for various other purposes; and I do hereby declare that the following is a full and exact description thereof.

The nature of my invention consists in the compounding of ingredients for covering roofs and for various other purposes.

To enable others skilled in the art to compound and use my invention, I will proceed to describe the compounding of the same.

I take one pound of rosin, one pound of leached ashes, one-half pound of whiting, one-half pound of salt, one-eighth of a pound of red lead, one-eighth of a pound of linseed-oil; pound or grind them well together; put all into a kettle, heat and stir slowly until all is well melted and mixed. Apply, when warm, with a brush. Slate or soft adhesive stone can be ground and used instead of ashes. When cold, iron down smooth with a self-heating sad-iron.

What I claim as my invention, and desire to secure by Letters Patent, is—

The compounding of ingredients, as herein described, to make a composition for roofing and for various other purposes, as before described.

May 28, 1868.

CARLETON B. HUTCHINS.

Witnesses:
JOHN F. LAWRENCE,
H. B. HUTCHINS.